United States Patent
Genetti et al.

(10) Patent No.: US 8,532,086 B1
(45) Date of Patent: Sep. 10, 2013

(54) METHOD AND SYSTEM FOR MULTI LEVEL SWITCH CONFIGURATION

(75) Inventors: Wayne A. Genetti, Sanatoga, PA (US); Philip Murphy, Wayne, PA (US); Brent R. Rothermel, Pottstown, PA (US); Vladimir Tamarkin, Huntington Valley, PA (US)

(73) Assignee: Intel Corporation, Santa Clara, CA (US)

( * ) Notice: Subject to any disclaimer, the term of this patent is extended or adjusted under 35 U.S.C. 154(b) by 182 days.

(21) Appl. No.: 13/155,247

(22) Filed: Jun. 7, 2011

Related U.S. Application Data

(63) Continuation of application No. 12/415,914, filed on Mar. 31, 2009, now Pat. No. 7,983,194.

(60) Provisional application No. 61/114,887, filed on Nov. 14, 2008.

(51) Int. Cl.
*H04L 12/28* (2006.01)

(52) U.S. Cl.
USPC .......................................................... 370/351

(58) Field of Classification Search
USPC ................................................ 370/351–430
See application file for complete search history.

(56) References Cited

U.S. PATENT DOCUMENTS

| | | | |
|---|---|---|---|
| 7,123,612 B2 | 10/2006 | Lu | |
| 7,362,135 B1 | 4/2008 | Chang | |
| 2005/0105538 A1 | 5/2005 | Perera et al. | |
| 2005/0141804 A1 | 6/2005 | Yang et al. | |
| 2006/0165070 A1* | 7/2006 | Hall et al. | 370/369 |
| 2007/0280261 A1 | 12/2007 | Szymanski | |

OTHER PUBLICATIONS

"Office Action from USPTO dated Aug. 4, 2010 for U.S. Appl. No. 12/415,914".
"Final Office Action from USPTO dated Feb. 2, 2011 for U.S. Appl. No. 12/415,914".
"Notice of Allowance from USPTO dated Jun. 1, 2011 for U.S. Appl. No. 12/415,914".

* cited by examiner

*Primary Examiner* — Fan Ng
(74) *Attorney, Agent, or Firm* — Blakely, Sokoloff, Taylor & Zafman LLP

(57) ABSTRACT

Switch systems and method to configure switch systems are disclosed. A switch system includes a first leaf module and a first spine module. The first leaf module includes a plurality of internal ports and external ports. The first spine module includes a plurality of ports. A midplane is configured to couple each of the internal port of first leaf module to a port of a first spine module such that a subset of internal ports of the first leaf module are always coupled to a known subset of first spine module. Other switch systems and methods to configure switch systems are disclosed.

6 Claims, 14 Drawing Sheets

METHOD AND SYSTEM FOR MULTI LEVEL SWITCH CONFIGURATION

CROSS REFERENCE TO RELATED APPLICATIONS

This application is a continuation of U.S. patent application Ser. No. 12/415,914, filed on Mar. 31, 2009, now U.S. Pat. No. 7,983,194 which claims priority to U.S. provisional patent application Ser. No. 61/114,887, filed on Nov. 14, 2008. The disclosures of the priority applications are hereby incorporated herein by reference in their entireties.

BACKGROUND

1. Technical Field

The present invention relates to networks, and more particularly, to networks with plurality of switches.

2. Related Art

Network systems are commonly used to move network information (may also be referred to interchangeably, as frames, packets or commands) between computing systems (for example, servers) or between computing systems and network devices (for example, storage systems). Various hardware and software components are used to implement network communication, including network switches.

A network switch is typically a multi-port device where each port manages a point-to-point connection between itself and a port of another system. Each port can be attached to a port of another server, peripheral, input/output subsystem, bridge, hub, router, or another switch. The term network switch as used herein includes a multi-level switch that uses plural switching elements within a single switch chassis to route data packets.

Clusters of systems are built by using multiple switches in one or more chassis. A multi-level switch that uses plural switching elements within a single switch chassis may be used as a building block to build a cluster. Multiple systems are interconnected by connecting ports of a system with ports of other systems in the clusters through for example, one or more multi-level switches.

Initially, a cluster may include a minimal number of systems coupled through one or more multi-level switches, with each multi-level switch providing a certain level of expandability. As computing needs increase, additional systems may be added to expand the cluster. As the cluster grows, there may be a need to add additional multi-level switches or add additional ports to couple additional systems or additional switches.

As the number of systems in a cluster is increased, there is a need to provide for an efficient multi-level switch that maximizes investment in switching hardware. As multi-level switches are in the path of two interconnected systems over a network, there is a need to provide a multi-level switch that ideally provides a bandwidth at the input of the switch and at the output of the switch that is comparable to the maximum bandwidth of the network. As multi-level switches add additional hops in the data path, when transmitting data from a source system to a destination system, there is a need to minimize the number of hops. As technology evolves, there is also a need to provide a multi-level switch that is flexible in providing expansion capability.

It is with one or more of these needs in mind that the current disclosure arises.

SUMMARY

In one embodiment, a switch system to network a plurality of systems is provided. The switch system includes a first leaf module having a plurality of ports divided into internal ports and external ports and a plurality of first spine modules, each first spine module having a plurality of ports. A midplane is configured to couple each of the internal port of first leaf module to a port of a first spine module such that a subset of internal ports of the first leaf module are always coupled to a known subset of first spine module.

In another embodiment, a switch system to cluster a plurality of systems is disclosed. The switch system includes a first leaf module having a plurality of ports divided into internal ports and external ports, the number of internal ports and external ports being equal, a second leaf module having a plurality of ports divided into internal ports and external ports, the number of external ports being greater than the number of internal ports. The system further includes a plurality of first spine modules, each spine module having a plurality of ports to couple with an internal port of the first leaf module or the second leaf module. A midplane to receive either a plurality of first leaf modules or a plurality of second leaf modules and a plurality of spine modules and configured to couple an internal port of each of first leaf module or the second leaf module to a port of a first spine module, such that a subset of internal ports of the first leaf modules at least equal to the difference between the number of external ports and internal ports of the second leaf module are always coupled to a known subset of first spine modules.

In another embodiment, a network switch system is provided. The system includes a leaf module having a set of ports divided into internal ports and external ports, the number of internal ports and external ports being equal. The system also includes another leaf module having a set of ports divided into internal ports and external ports, the number of external ports being equal to the number of internal ports. The number set of ports of the leaf module being different than the number set of ports of the another leaf module.

The system further includes a spine module with a first set of ports; another spine module with a second set of ports; and a midplane to selectively receive either the leaf module and the spine module or the another leaf module and the another spine module and configured to couple an internal port of each of the leaf module to a port of the spine module; or couple the another leaf module to a port of the another spine module.

In yet another embodiment a switch system is disclosed. The switch system includes a plurality of leaf-spine modules. The leaf-spine module includes at least two leaf modules and a spine module. Each of the leaf modules has a plurality of internal ports. Each of the spine modules has a plurality of ports. The leaf-spine module is configured to couple an internal port of the leaf module to a port of the spine module. A midplane is configured to receive a plurality of leaf-spine modules and the midplane is configured to couple an internal port of a leaf module of a leaf-spine module to a port of a spine module of another leaf-spine module.

In yet another embodiment, a network of plurality of switches is disclosed. The network of plurality of switches includes a plurality of switches. Each switch includes a plurality of leaf modules and a plurality of spine modules. Each leaf module includes a plurality of external ports and a plurality of internal ports. Each spine module includes a plurality of ports grouped into a first group of ports and a second group of ports. One of the plurality of internal ports of each of the leaf module of a switch is coupled to a port of the first group of ports of each of the spine module of the switch. One of the ports of the second group of ports of at least one of the spine module of one switch is coupled to a port of the second group of ports of at least one spine module of another switch.

In yet another embodiment, a method to configure a switch system to network a plurality of systems is disclosed. The method includes providing a first leaf module having a plurality of ports divided into internal ports and external ports. The method further includes providing a plurality of first spine modules, with each first spine module having a plurality of ports. The method further includes configuring a midplane to couple each of the internal port of first leaf module to a port of a first spine module such that a subset of internal ports of the first leaf module are always coupled to a known subset of first spine modules.

In yet another embodiment, a method to selectively configure a network switch system is disclosed. The method includes: providing a leaf module having a set of ports divided into internal ports and external ports, the number of internal ports and external ports being equal; providing another leaf module having a set of ports divided into internal ports and external ports, the number of external ports being equal to the number of internal ports. The number set of ports of the leaf module being different than the number set of ports of the another leaf module.

The method further includes providing a spine module with a first set of ports; providing another spine module with a second set of ports; and configuring a midplane to selectively receive either the leaf module and the spine module or the another leaf module and the another spine module and couple an internal port of the leaf module to a port of the spine module; or couple the another leaf module to a port of the another spine module.

In yet another embodiment, a method of configuring a switch system is disclosed. The method includes providing a plurality of leaf-spine modules, each leaf-spine module including at least two leaf modules and a spine module. Each of the leaf module has a plurality of internal ports. Each of the spine module has a plurality of ports. The method further includes configuring the leaf-spine module to couple an internal port of the leaf module to a port of the spine module. Additionally, the method includes providing a midplane configured to receive a plurality of leaf-spine modules and configuring the midplane to couple an internal port of a leaf module of a leaf-spine module to a port of a spine module of another leaf-spine module.

In yet another embodiment, a method of networking a plurality of switches is disclosed. The method includes providing a plurality of switches, with each switch including a plurality of leaf modules and a plurality of spine modules. Each leaf module includes a plurality of external ports and a plurality of internal ports. Each spine module having a plurality of ports, the plurality of ports grouped into a first group of ports and a second group of ports. The method further includes coupling one of the plurality of internal ports of each of the leaf module of a switch to a port of the first group of ports of each of the spine module of the switch; and coupling one of the ports of the second group of ports of at least one of the spine module of a switch to a port of the second group of ports of at least one spine module of another switch.

This brief summary has been provided so that the nature of the disclosure may be understood quickly. A more complete understanding of the disclosure can be obtained by reference to the following detailed description of the various embodiments thereof concerning the attached drawings.

BRIEF DESCRIPTION OF THE DRAWINGS

The foregoing features and other features of the present disclosure will now be described with reference to the drawings of the various embodiments. In the drawings, the same components have the same reference numerals. The illustrated embodiments are intended to illustrate, but not to limit the disclosure. The drawings include the following Figures.

DETAILED DESCRIPTION

Definitions

The following definitions are provided for convenience as they are typically (but not exclusively) used in network systems and in general networking environment, implementing the various adaptive aspects described herein.

"Backplane" means a collection of a plurality of connectors, typically disposed on a side of a circuit board carrier, with one or more pins of a connector coupled to one or more pins of another connector through conductors in the circuit board carrier. The connectors are typically configured to receive circuit boards with components and couple components of one circuit board to components of other circuit boards, through the conductors in the circuit board carrier.

"Leaf Module" means a switch with a plurality of ports, with some ports configured to couple to systems and some ports configured to couple to other switches.

"Midplane" means a collection of a plurality of connectors, typically disposed on both sides of a circuit board carrier, with one or more pins of a connector coupled to one or more pins of another connector through conductors in the circuit board carrier. The connectors are typically configured to receive circuit boards with components on both sides of the circuit board carrier and couple components of one circuit board to components of other circuit boards, through the conductors in the circuit board carrier.

"Multi Level Switch" means a network switch that includes a plurality of switch elements operationally coupled together.

"Spine Module" means a switch with a plurality of ports configured to couple to ports of other switches. Other switches may be leaf modules.

"Switch" means a networked device that facilities network communication conforming to certain protocols/standards, for example, the Infiniband (IB) protocol.

To facilitate an understanding of the various embodiments, the general architecture and operation of a network system will be described. The specific architecture and operation of the various embodiments will then be described with reference to the general architecture of the network system.

Various network protocols/standards are used for network communication. IB is one such standard. IB is a switched fabric interconnect standard typically deployed for server clusters/enterprise data centers ranging from two to thousands of nodes. The IB standard is published by the InfiniBand Trade Association, and is incorporated herein by reference in its entirety.

An IB switch is typically a multi-port device. Physical links (optical or copper) connect each port in a switch to another IB switch or an end device (for example, a Target Channel Adapter (TCA) or a Host Channel Adapter (HCA)).

Figure 1A:
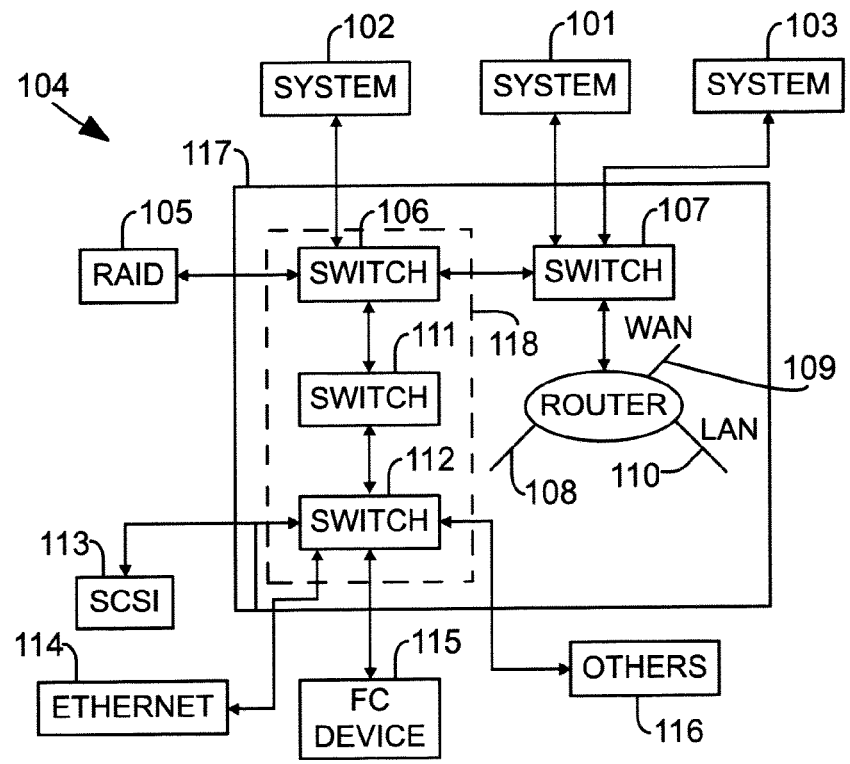
FIG. 1A shows a block diagram of a network system, according to one embodiment.

FIG. 1A shows a block diagram of a network system 104. System 104 includes a switching fabric 117, which includes plural network switches 106, 107, 111 and 112 for moving network packets. Fabric 117 also includes a router 108 that is coupled to a wide area network 109 and local area network 110.

Switch 106 is operationally coupled to storage system 105 (for example, a RAID (redundant array of inexpensive disks) system) and to system 102, while system 101 and 103 may be operationally coupled to switch 107.

Switch 112 may be coupled to a small computer system interface ("SCSI") SCSI port 113 that is coupled to SCSI based devices (not shown). Switch 112 may also be coupled to an Ethernet port 114, Fibre Channel device (s) 115 and other device(s) 116.

Switch 111 may couple switches 106 and 112 to enable communication between a system connected to switch 106 and a system connected to switch 112. In some embodiments, switch 111 is referred to as a spine module and switches 106 and 112 are referred to as leaf modules.

Switches 106, 111 and 112 may be interconnected within a fabric 117, using for example, one or more connectors. In some embodiments, a backplane with one or more connectors may be used to receive the leaf modules and the spine modules. An embodiment of a backplane is referred to as a midplane. In one embodiment, the midplane includes an elongated body that has one or more connectors disposed on both sides of the elongated body so that switch modules may be physically received on both sides of the midplane. In one embodiment, a midplane may be configured to receive multiple switch modules on both sides of the midplane.

The connectors of the midplane may include a plurality of pins or electrical traces to provide electrical coupling to the switch modules. The midplane may further include electrical conductors to interconnect various pins of the connectors so that switch modules may communicate with each others. As an example, a midplane may be configured to electrically couple a leaf module and a spine module.

Systems 101-103 may be computing systems that typically include several functional components. These components may include a central processing unit (CPU), main memory, input/output ("I/O") devices, and streaming storage devices (for example, tape drives). In typical computing systems 101-103, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system or host computing system.

Figure 1B:
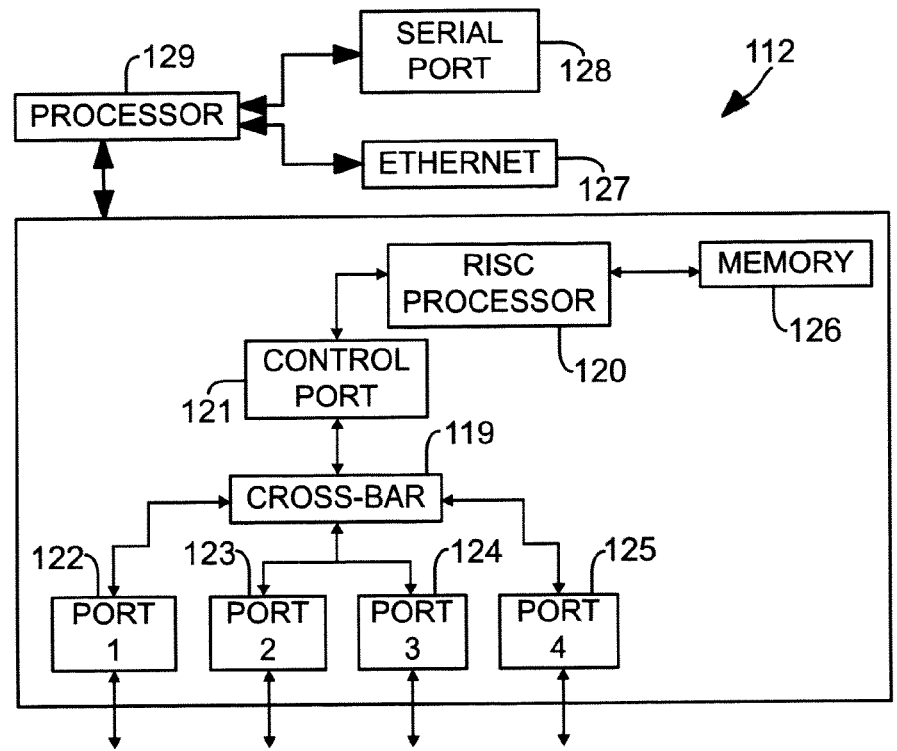
FIG. 1B shows a block diagram of a switch in a network system, according to one embodiment.

FIG. 1B shows a block diagram of switch 112 that includes a processor 120, which is operationally coupled to plural ports 122, 123, 124 and 125 via a control port 121, and crossbar 119. In one embodiment, processor 120 may be a reduced instruction set computer (RISC) type microprocessor. In one embodiment, the switch 112 may be referred to as a leaf module.

Switch 112 may be coupled to an external processor 129 that is coupled to an Ethernet port 127 and serial port 128. In one embodiment, processor 129 may be a part of a computing system (for example, 101-103). An administrator may use processor 129 to configure switch 112.

Figure 1C:
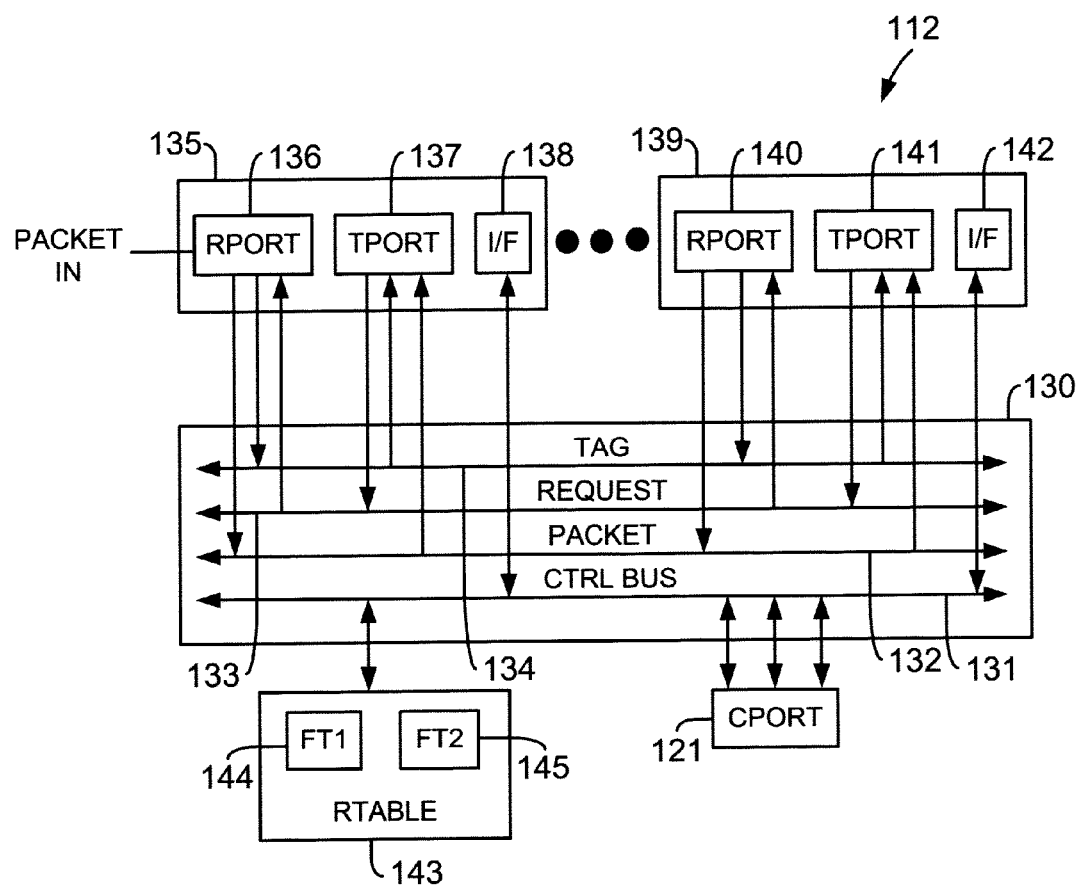
FIG. 1C shows another block diagram of a switch, according to one embodiment.

FIG. 1C shows another block diagram of a switch 112 (or switch element 112) with a switch fabric 130. Switch fabric 130 is operationally coupled to control port (CPORT) 121 and plural ports 135 and 139. It is noteworthy that ports 135 and 139 are similar to ports 122-125.

Switch fabric 130 includes a packet data crossbar 132, packet request crossbar 123 and packet tag crossbar 134 and a control bus 131.

Packet data crossbar 132 connects receive ports (136, 140) and transmit ports (137,141), and can concurrently transmit plural packets.

Packet Tag crossbar 133 may also be used to move plural packet tags from receive ports (136, 140) to transmit ports (137, 141), as described below.

Packet request crossbar 133 is used by transmit port (137, 141) to request a particular packet from a receive buffer.

Interface (I/F) 138 and 142 provide input/output interface to switch 112.

Switch 112 may be implemented as a switch element of a single CMOS ASIC (application specific integrated circuit), and for this reason the term "switch", "switch element" and ASIC are used interchangeably to refer to the various embodiments in this specification.

Referring to FIG. 1A, in one embodiment, the switch 106 as a leaf module may be similar to switch 112 and may be configured as a leaf module. In another embodiment, switch 111 may be similar to switch 112 and may be configured as a spine module to couple two switches, for example, switch 106 and switch 112. In such a configuration, ports of switch 111 (for example, similar to ports 122-125 of switch 112) may be configured to be coupled to ports of other spine modules (not shown) or other leaf modules (for example, switch 106 and switch 112).

Figure 1D:
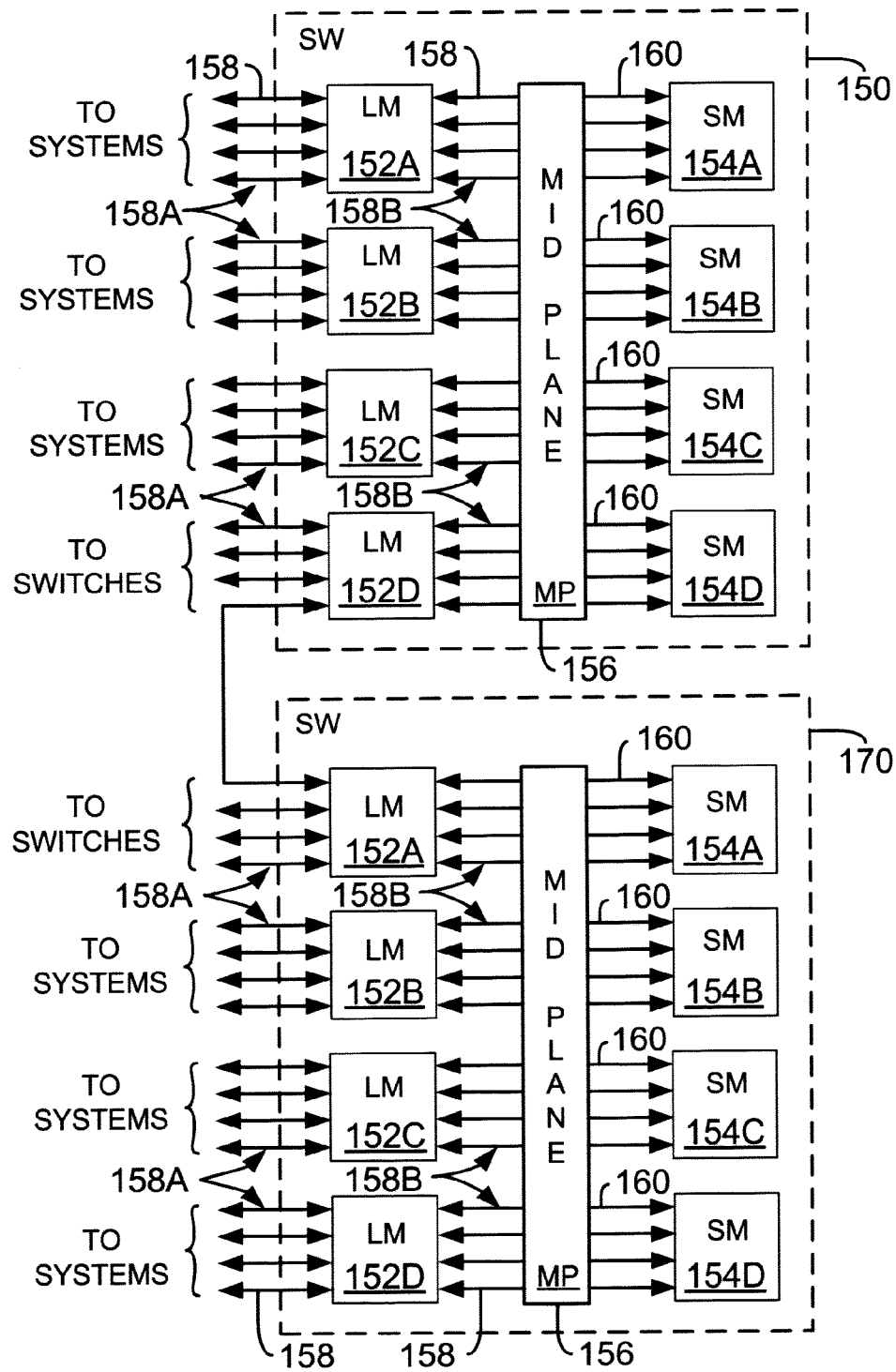
FIG. 1D shows a plurality of switch fabrics, with exemplary coupling within the switch fabrics and between the switch fabrics.

FIG. 1D shows switch fabrics 150 and 170 with exemplary coupling within the switch fabrics 150, 170 and between the switch fabrics 150 and 170. In one embodiment, switch fabrics 150 and 170 may each be contained in a separate enclosure. Switch fabrics 150, 170 include a plurality of leaf modules 152A-D, a plurality of spine modules 154A-D and a midplane 156 providing interconnection between leaf modules 152A-D and spine modules 154A-D.

Each of the leaf modules 152A-D include a plurality of ports 158. Each of the spine modules 154A-D include a plurality of ports 160. The plurality of ports 158 of each of the leaf module 152A-D are divided into external ports 158A and internal ports 158B.

The plurality of external ports of a leaf module are used to couple to ports of other systems or ports of other switch fabrics. As an example, one of the external ports 158A of leaf module 152A may be coupled to a port of a system (not shown). As another example, one of the external ports 158A of leaf module 152D of switch fabric 150 may be coupled to one of the external ports 158A of leaf module 158A of switch fabric 170.

The plurality of internal ports 158B of a leaf module 152A-152D is coupled to a port 160 of a spine module 154A-154D. In one embodiment, the coupling between an internal port 158B of a leaf module 152A-152D and a port 160 of a spine module 154A-154D is accomplished using the midplane 156.

Various aspects of configuring a midplane to couple leaf modules with spine modules to achieve different objectives of this disclosure will now be described in detail.

Figure 2A:
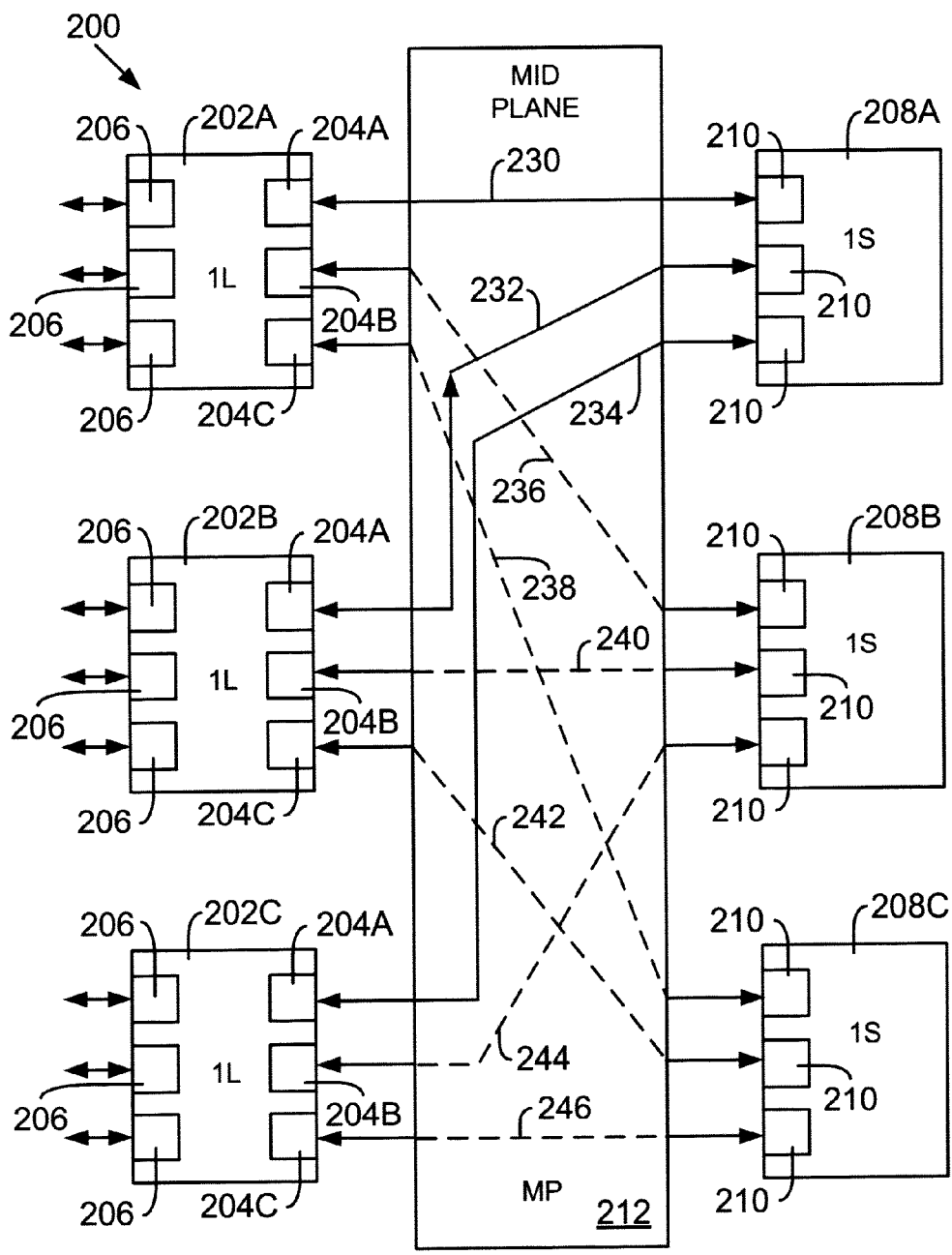
FIGS. 2A and 2B show a switch system, according to one embodiment of this disclosure.
Figure 2B:
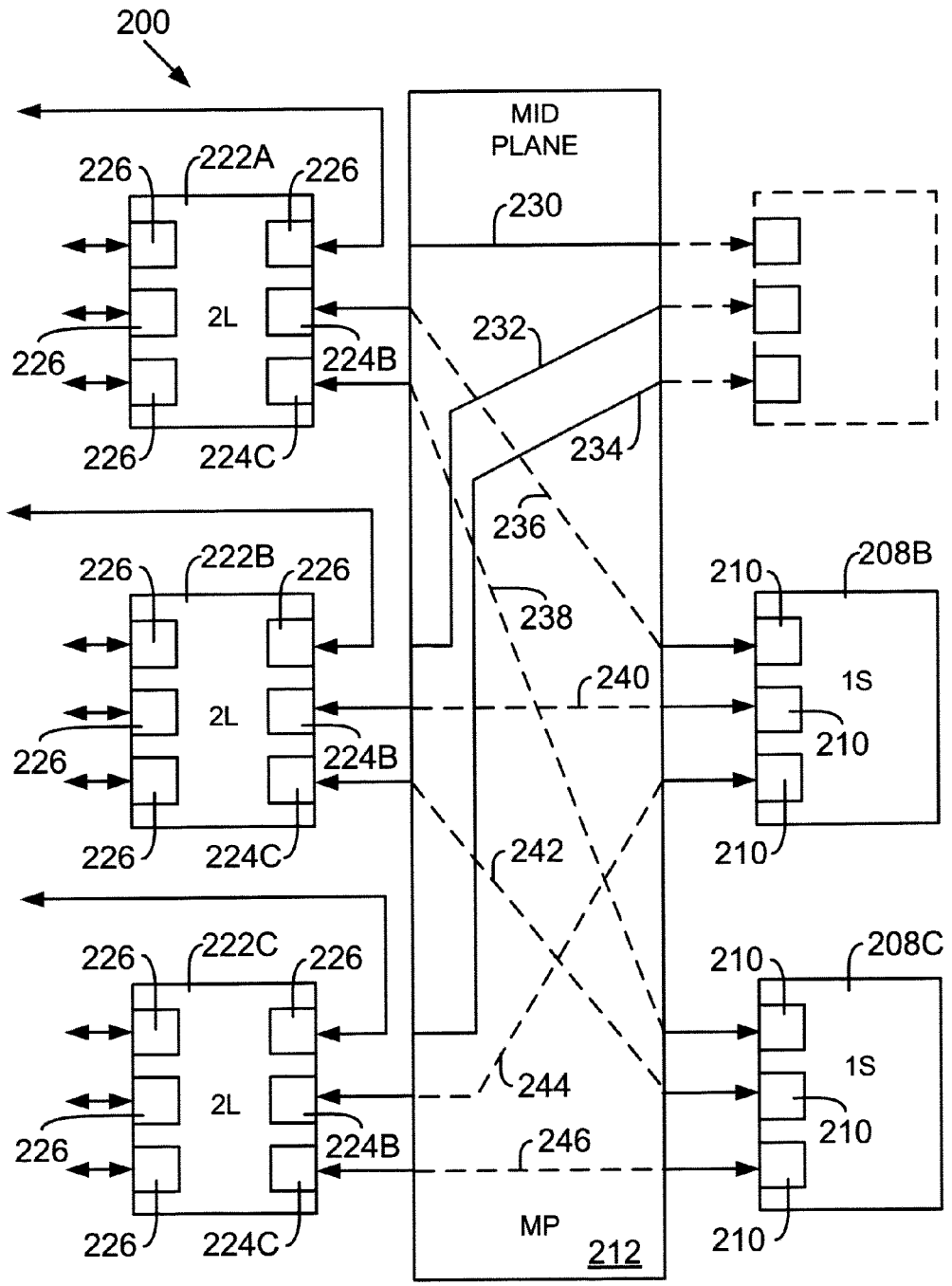

FIGS. 2A and 2B show one embodiment of this disclosure where a switch system 200 with midplane 212 is configured to receive either a plurality of first leaf modules 202A-C or a plurality of second leaf modules 222A-C. The midplane 212 is further configured to couple either the plurality of first leaf modules 202A-C or the plurality of second leaf modules 222A-C to a plurality of first spine modules 208A-C. Further details of system 200 will be described in detail below.

Referring to FIG. 2A, the first leaf modules 202A-C each include a plurality of external ports 206 and a plurality of internal ports 204A-C.

The first spine modules 208A-C each include a plurality of ports 210.

Referring to FIG. 2B, the second leaf modules 222A-222C each include a plurality of external ports 226 and a plurality of internal ports 224B-224C.

In one embodiment, the number of internal ports 224B-224C of the second leaf modules 222A-222C are less than the number of internal ports 204A-204C of the first leaf modules 202A-202C.

In yet another embodiment, the number of external ports 206 of the first leaf modules 202A-202C is less than the number of external ports 206 of the second leaf modules 222A-222C.

In yet another embodiment, the total number of ports (total of internal ports 204A-C and external ports 206) in the first leaf modules 202A-202C is same as the total number of ports (total of internal ports 224B-C and external ports 226) of the second leaf modules 222A-222C.

In one embodiment, the number of first spine modules 208A-208C required to couple the first leaf modules 202A-202C is more than the number of spine modules 208B-208C required to couple the second leaf modules 222A-222C.

In the specific example shown, referring to FIG. 2A, the number of internal ports of first leaf modules 202A-202C is three (204A-204C) and number of spine modules required to couple the first leaf modules 202A-202C is three (208A-208C). The number of external ports 206 for the first leaf modules 202A-202C is three.

Referring to FIG. 2B, the number of internal ports of the second leaf modules 222A-222C is two (224B and 224C) and the number of external ports 226 is four. The number of spine modules required to couple the second leaf modules 222A-222C is two (208B and 208C).

One skilled in the art can appreciate that although the examples described above use a specific number of internal and external ports, these concepts can be used with leaf modules and spine modules having different number of ports than what is described above with reference to FIGS. 2A and 2B.

Now again referring to FIG. 2A, the midplane 212 is configured to couple each of the internal ports 204A-204C of the first leaf modules 202A-202C to a port 210 of first spine modules 208A-208C. Signal lines 230, 232, 234, 236, 238, 240, 242, 244 and 246 couple an internal port 204A-204C of a first leaf module 202A-202C to a port 210 of a first spine module 208A-208C. Although the signal lines 230, 232 and 234 are shown in solid lines and signal lines 236, 238, 240, 242, 244 and 246 are shown in dashed line to further explain the specific embodiments of this disclosure, functionally, the signal lines are similar in that they couple ports of a leaf module to ports of a spine module.

It is desirable to minimize the number of hops required to communicate between a system connected to external port of one leaf module and another system connected to an external port of another leaf module. A hop corresponds to data transfer from an input port to an output port of a leaf module or a spine module.

In one embodiment, at least one of the internal ports of each leaf module is coupled to at least one port of a spine module, to minimize the number of hops required to communicate between systems connected to external ports of two different leaf modules.

For example, as shown in FIG. 2A, a source system coupled to an external port 206 of first leaf module 202A can communicate with a destination system coupled to an external port 206 of first leaf module 202C within three hops. The first leaf module 202A and first leaf module 202C are both coupled to a common first spine module 208C. A data packet is transferred from the first leaf module 202A to first leaf module 202C through the common first spine module 208C.

The first hop occurs when a data packet from the external port 206 of first leaf module 202A is transferred to the internal port 204C of first leaf module 202A. The internal port 204C of the first leaf module 202A is coupled to a port 210 of the first spine module 208C through signal line 238. The transferred data packet is presented to the port 210 of the first spine module 208C using the signal line 238.

The second hop occurs when the data packet transfers from the port 210 of the first spine module 208C coupled to the first leaf module 202A to the port 210 of the first spine module 208C coupled to the first leaf module 202C. The data packet is now presented to the internal port 204C of first leaf module 202C using signal line 246.

The third hop occurs when the data transfers from the internal port 204C of the first leaf module 202C to the external port 206 of the first leaf module 202c coupled to the destination system.

In another embodiment, a subset of the internal ports of the first leaf modules is always coupled to a known subset of first spine modules. For example, referring to FIG. 2A, a subset of internal ports 204a of the first leaf modules 202A-202C are always coupled to a known subset of first spine modules, for example, first spine module 208A, using signal lines 230, 232 and 234 represented as solid lines. One of the benefits of such a configuration will be explained with respect to FIG. 2B.

Now referring to FIG. 2B, second leaf modules 222A-222C are coupled to the first spine modules 208B and 208C. Each of the second leaf modules 222A-222C have two internal ports 224B and 224C. Each of the second leaf modules 222A-222C also includes four external ports 226.

As is readily apparent from FIG. 2B, the midplane 212 as configured with respect to FIG. 2A may be used to couple second leaf modules with first spine modules, without any changes to the midplane. Each of the internal ports 224B and 224C of the second leaf modules 222A-222C are coupled to a port 210 of the first spine modules other than the known subset of spine module 208A. In this embodiment, the signal lines 230, 232 and 234 (shown as solid lines) are not used to couple an internal port of a leaf module to a port of a spine module.

In fact, in the configuration described with reference to FIG. 2B, the known subset of the first spine modules, for example first spine module 208A need not be used in the switch fabric. As one skilled in the art appreciates, the configuration described with respect to FIG. 2B provides more output ports than the configuration described with respect to FIG. 2A and further saves the use of one spine module.

Full Bisectional Bandwidth

It is desirable to have a switch fabric that can transfer data through its switches at a rate comparable to the rate at which data is received so as to minimize bottleneck. One measure of data transfer capability of a switch fabric is full bisectional bandwidth. A switch is capable of providing full bisectional bandwidth when the sum of the data transfer rate at the external ports of a first leaf module (i.e data transfer rate per external port of a leaf module times number of ports) equals to the sum of the data transfer rates at the ports of the first spine modules that receive the data from the corresponding first leaf module (i.e data transfer rate per port of spine modules that receive the data from the corresponding first leaf module times number of ports).

With respect to the configuration shown in FIG. 2A, the number of external ports 206 of the first leaf modules 202A-202C is three. Three internal ports 204A-204C of each of the first leaf modules are coupled to a port 210 of three first spine modules 208A-208C. So, the number of ports of the spine modules that receive the data from the corresponding first leaf module is the same as the number of external ports of the first leaf module. In this configuration, in order to achieve full bisectional bandwidth, the external ports of the first leaf modules 202A-202C and the ports of first spine modules 208A-208C are run at about the same speed.

With respect to the configuration shown in FIG. 2B, the number of external ports 226 of the second leaf modules 222A-222C is four. Two internal ports 224B and 224C of each of the second leaf modules 222A-222C are coupled to a port 210 of two first spine modules 208B and 208C. So, the number of ports of the first spine modules that receive the data from the corresponding second leaf module is half the number of external ports of the second leaf module. In this configuration, in order to achieve full bisectional bandwidth, the ports of first spine modules 208B and 208C are run at about twice the speed of external ports of the second leaf modules 222A-222C.

In one embodiment, a second leaf module may include the same number of ports as the first leaf module, but with more ports designated as external ports. For example, as shown in FIG. 2B, both the first leaf modules 202A-202C and the second leaf module 222A-222C include six ports. However, in the first leaf modules 202A-202C, three ports are designated as external ports and in the second leaf modules 222A-222C, four ports are designated as external ports. As the external ports are typically used to couple to systems in a network, the configuration described with respect to FIG. 2B permits more systems to be coupled to the switch than the configuration described with reference to FIG. 2A.

In one embodiment, an ASIC with multiple ports may be configured to create either a first leaf module with equal number of internal ports and external ports as described with reference to FIG. 2A or a second leaf module with more number of external ports than the internal ports, as described with respect to FIG. 2B.

Figure 3A:
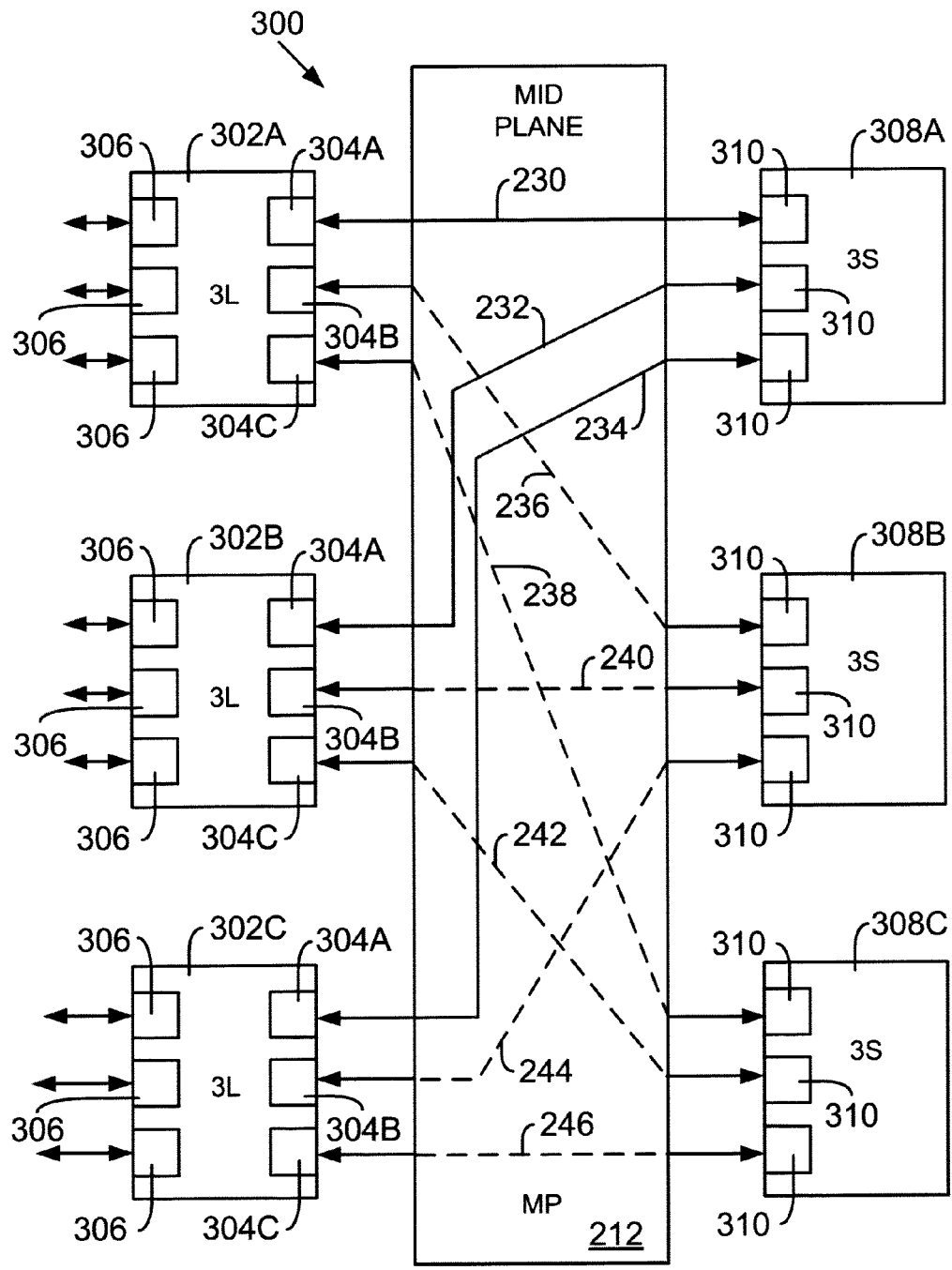
FIGS. 3A, 3B and 3C show a switch system, according to one embodiment of this disclosure.
Figure 3B:
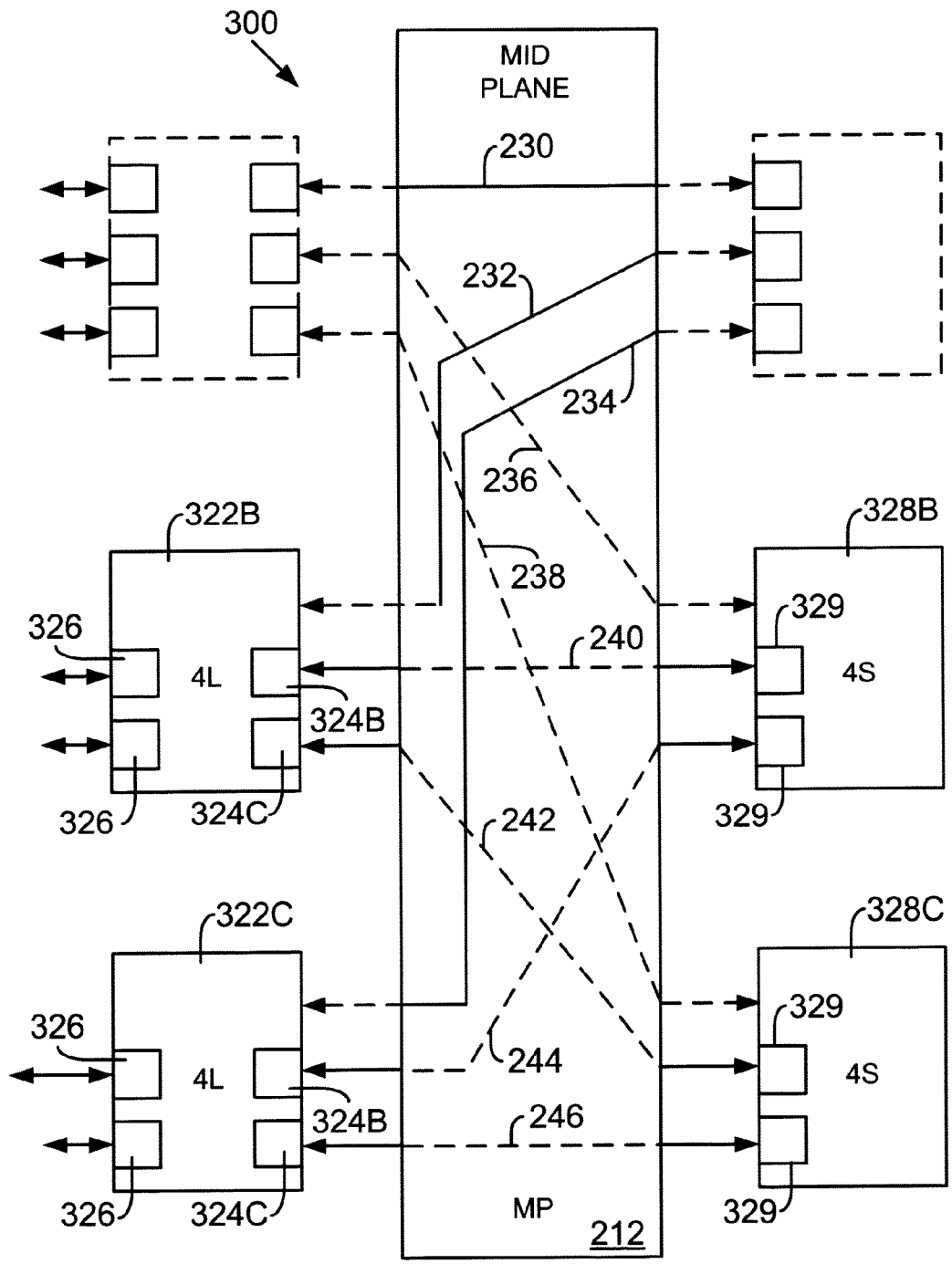

FIGS. 3A and 3B show another embodiment of this disclosure where a switch system 300 with a midplane 212 as described with respect to FIGS. 2A and 2B is configured to receive either a plurality of third leaf modules 302A-302C and a plurality of third spine modules 308A-308C or a plurality of fourth leaf modules 322B and 322C and a plurality of fourth spine modules 328B and 328C and couple them. Further details of system 300 will be described in detail below.

Referring to FIG. 3A, the third leaf modules 302A-302C include a plurality of external ports 306 and a plurality of internal ports 304A-304C. The third spine modules 308A-308C include a plurality of ports 310.

Referring to FIG. 3B, the fourth leaf modules 322B and 322C include a plurality of external ports 326 and a plurality of internal ports 324B and 324C. The fourth spine modules 328B and 328C include a plurality of ports 329.

In one embodiment, the number of internal ports of fourth leaf modules is less than the number of internal ports of third leaf modules. For example, the number of internal ports 324B-324C of each of the fourth leaf modules 322B-322C is less than the number of internal ports 304A-304C of third leaf modules 302A-302C.

In yet another embodiment, the number of external ports of the third leaf modules is more than the number of external ports of the fourth leaf modules. For example, external ports 306 of the third leaf modules 302A-302C is three and is more than the number of external ports 326 of the fourth leaf modules 322B-322C, which is two.

In yet another embodiment, the number of external ports and internal ports of the third leaf modules are equal. For example, external ports 306 of the third leaf module 302A-302C and the number of internal ports 304A-304C of the third leaf modules 302A-302C are equal to three.

In yet another embodiment, the number of external ports and the internal ports of the fourth leaf modules are equal. For example, the number of external ports 326 of fourth leaf module 322B and 322C and number of internal ports 324B and 324C are equal to two.

In one embodiment, the number of third spine modules used to couple the third leaf modules is more than the number of fourth spine modules. For example, the number of spine modules 308A-308C used to couple the third leaf modules 302A-302C is three and the number of fourth spine modules 322B-322C used to couple the fourth leaf modules 322B-322C is two.

As one skilled in the art appreciates, although the specific examples are described using a specific number of internal and external ports, these concepts can be used in leaf modules and spine modules having different number of ports than what is described above with reference to FIGS. 3A and 3B.

Now referring to FIG. 3A, the midplane 212 is configured to couple each of the internal ports 304A-304C of the third leaf modules 302A-302C to a port 310 of a third spine module 308A-308C. Signal lines 230, 232, 234, 236, 238, 240, 242, 244 and 246 couple an internal port of a third leaf module 302A-302C to port 310 of third spine modules 308A-308C. Although the signal lines 230, 232 and 234 are shown in solid lines and signal lines 236, 238, 240, 242, 244 and 246 are shown in dashed line to further explain the specific embodiments of this disclosure, functionally, the signal lines are similar in that they couple ports of a leaf module to a spine module.

As previously discussed with respect to FIG. 2A and FIG. 2B, it is desirable to minimize the number of hops required to communicate between a system connected to external port of one leaf module and another system connected to an external port of another leaf module. A hop corresponds to data transfer from an input port to an output port of a leaf module or a spine module.

In both the configurations described with reference to FIGS. 3A and 3B, at least one of the internal ports of each leaf module is coupled to at least one port of a spine module, to minimize the number of hops to three, as previously discussed with respect to FIG. 2A and FIG. 2B.

Now, continuing to refer to FIG. 3A, each of the third leaf modules 302A-302C has three internal ports 304A-C. Each of the third spine modules 308A-C has three ports 310. The internal ports 304A of all the third leaf modules 302A-C are coupled to the ports 310 of fourth spine module 308A, through signal lines 230, 232 and 234 of midplane 212. For discussion purposes, these signal lines are shown in solid lines. Other internal ports 304B-304C of the third leaf modules 302 are coupled to a port 310 of the third spine modules 308A-308C using signal lines 236, 238, 240, 242, 244 and 246, as shown in FIG. 3A.

Now, referring to FIG. 3B, each of the fourth leaf modules 322B-322C have two internal ports 324B-324C. Each of the fourth spine modules 328B-C have two ports 329. The internal ports 324B-324C of the fourth leaf modules 322B-322C are coupled to a port 329 of the fourth spine modules 328B-328C using signal lines 240, 242, 244 and 246. The internal ports 324B-324C of the fourth leaf modules 322B-324C are specifically not coupled to the fourth leaf modules using the signal lines 230, 232 and 234 of the midplane 212, shown as solid lines.

In one embodiment, the fourth leaf modules are configured such that a connector on the fourth leaf module that couples to the midplane 212 has connector locations corresponding to signal lines 230, 232 and 234 either missing or open, so that an internal port of fourth leaf module is not coupled to signal lines 230, 232 and 234.

As previously discussed with reference to FIGS. 2A and 2B, full bisectional bandwidth can be achieved when the sum of the data transfer rate at the external ports of a leaf module (i.e data transfer rate per external port of a leaf module times number of ports) equals to the sum of the data transfer rates at the ports of the spine modules that receive the data from the corresponding leaf module (i.e data transfer rate per port of spine modules that receive the data from the corresponding leaf module times number of ports).

In both the configurations described with reference to FIGS. 3A and 3B, the total number of external ports on a leaf module is equal to the total number of ports on a spine module that receive data from the corresponding leaf module. So, a full bisectional bandwidth can be achieved in both configurations by running the corresponding leaf modules and the spine modules at the same data rate.

Figure 3C:
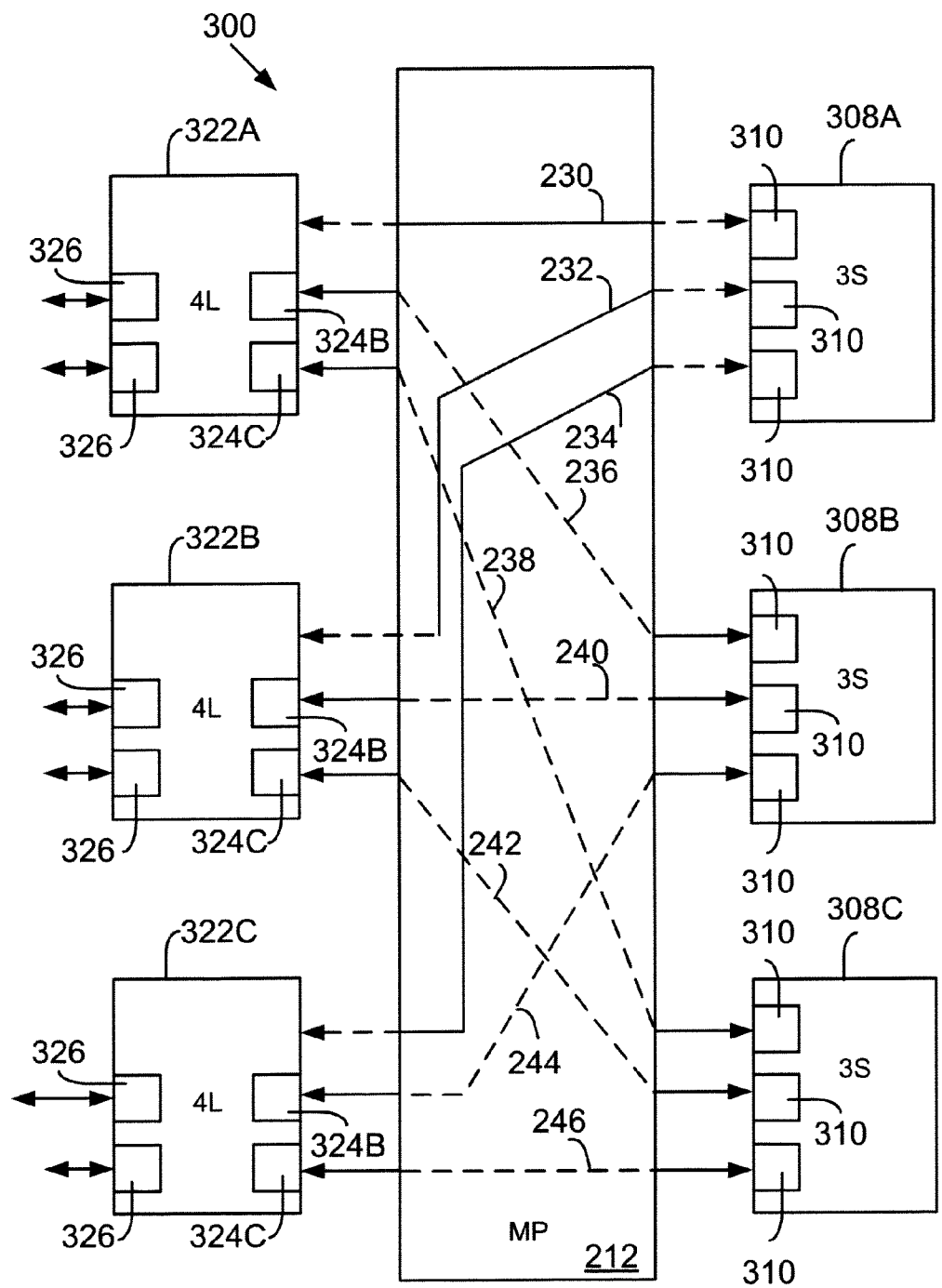

FIG. 3C shows yet another embodiment of this disclosure where a switch system 300 with a midplane 212 as described with respect to FIGS. 2A and 2B is configured to receive a plurality of fourth leaf modules 322A, 322B and 322C and a plurality of third spine modules 308A-308C and couple them. In one embodiment, the switch system 300 may operate without using the third spine module 308A, as none of the internal ports 324B-324C are coupled to the third spine module 308A.

As it is evident from reviewing FIG. 3C, an internal port 324B-324C of fourth leaf modules 322A-322C are coupled to a port 210 of third spine modules 308B-308C.

As one skilled in the art appreciates, the configuration described with reference to FIG. 3C permits coupling of leaf modules with less number of internal ports and external ports than ports of spine modules. As the total number of external ports on a leaf module is at least equal to the total number of ports on a spine module that receive data from the corresponding leaf module, full bisectional bandwidth can be achieved.

Although there may be unused ports or unused spine modules in the configuration described with reference to FIG. 3C, this configuration permits mixing of low port count leaf modules with high port count spine modules. Use of high port count spine modules permits expansion of the switch system by replacing the low port count leaf modules with high port count leaf modules. For example, a switch system 300 as described with reference to FIG. 3A may be configured by replacing the fourth leaf modules with third leaf modules.

Although the configurations of FIGS. 3A, 3B and 3C have been explained with a six port leaf modules and four port leaf modules, the concept can be expanded to leaf modules with different number of ports. As an example, in one configuration leaf modules with 36 ports (with 18 ports as external ports and 18 ports as internal ports) may be used with spine modules with 18 ports, when configured with a midplane as explained with respect to FIG. 3A. In another configuration, leaf modules with 24 ports (with 12 ports as external ports and 12 ports as internal ports) may be used with spine modules with 12 ports, using the same midplane, when configured as described with respect to FIG. 3B.

In yet another configuration, leaf modules with 24 ports (with 12 ports as external ports and 12 ports as internal ports) may be used with spine modules with 18 ports, using the same midplane, when configured as described with respect to FIG. 3C.

As it will be evident to one skilled in the art, various embodiments described with respect to FIGS. 2A, 2B, 3A, 3B and 3C have all been configured using a midplane 212, with a specific signal configuration. A switch system built with an exemplary midplane 212 as described provides flexibility in configuring a switch system with leaf modules and spine modules with different attributes, depending upon the needs of a switch fabric.

Figure 4A:
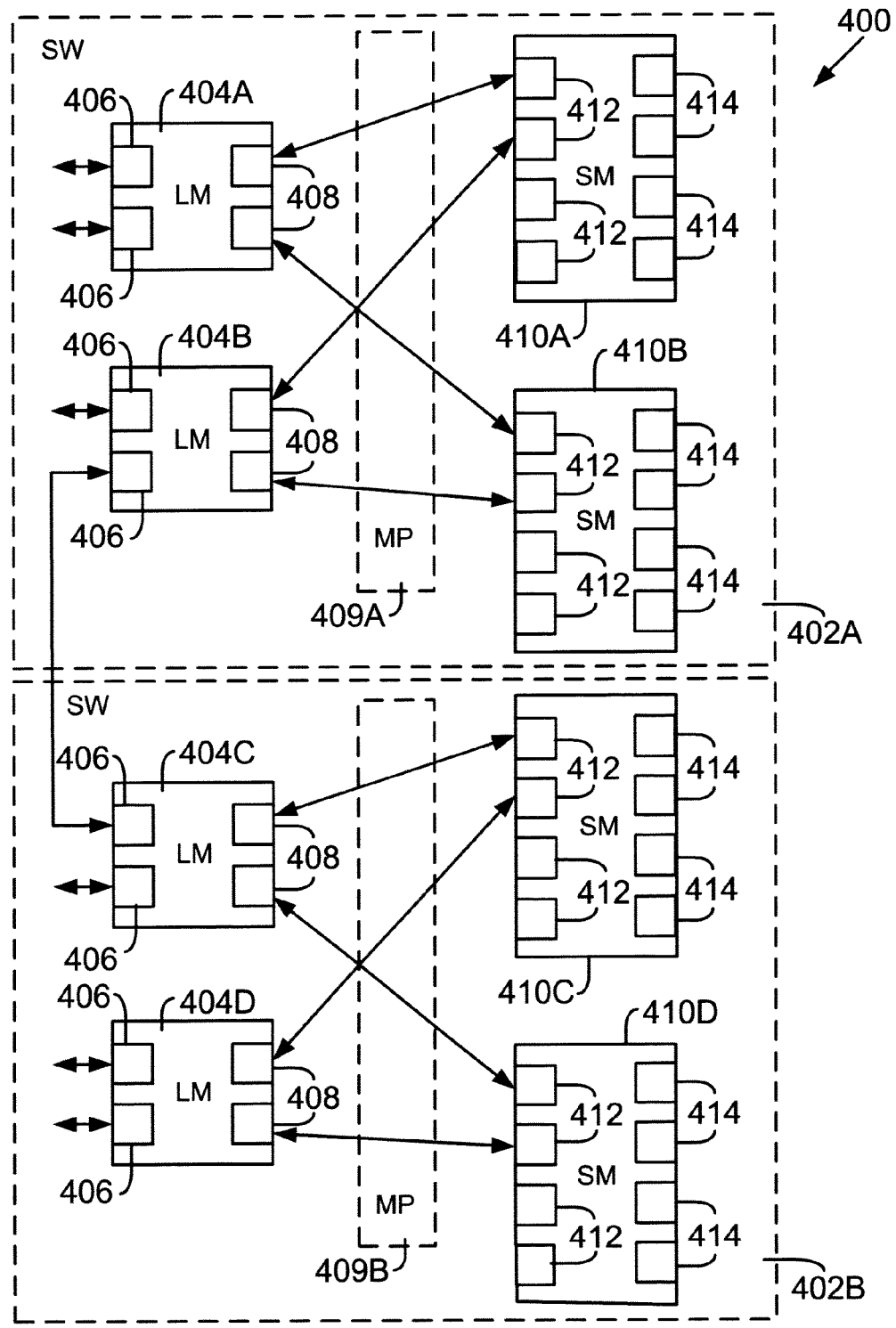
FIGS. 4A and 4B show a network of plurality of switches, according to one embodiment of this disclosure.
Figure 4B:
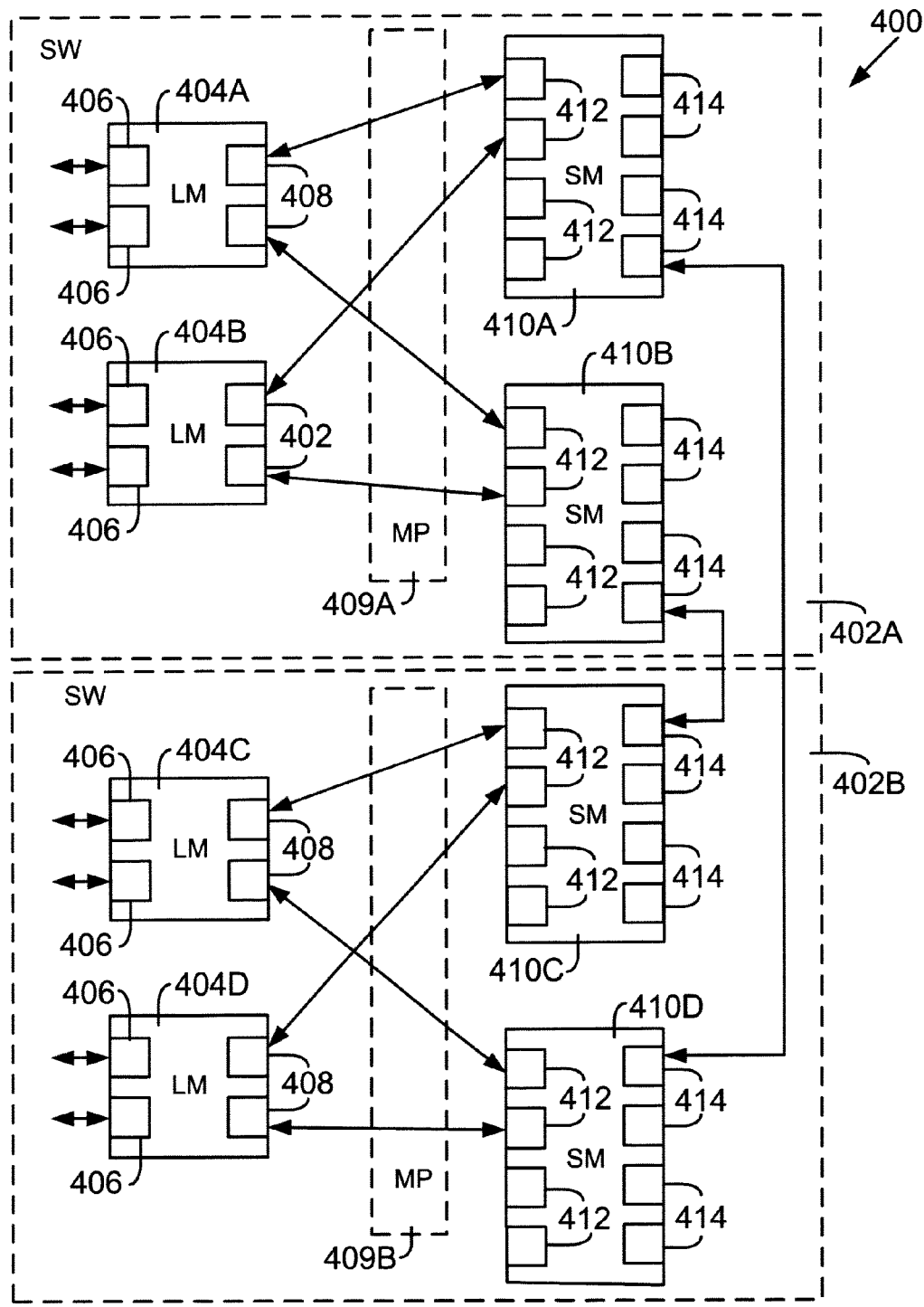

FIGS. 4A and 4B show yet another embodiment of this disclosure where a network of plurality of switches 400 is configured to provide different levels of performance, as defined by the maximum number of hops required to communicate between two systems, with a source system coupled to one of the switches 402A that communicates to a destination system coupled to another switch 402B. Further details will be described in detail below.

Referring to FIG. 4A, two switches 402A and 402B are provided. Switch 402A includes a plurality of fifth leaf modules 404A and 404B and a plurality of fifth spine modules 410A and 410B. Switch 402B includes a plurality of fifth leaf modules 404C and 404D and a plurality of fifth spine modules 410C and 410D.

Each of the fifth leaf modules 404A-404D includes a plurality of external ports 406 and a plurality of internal ports 408. Each of the fifth spine modules 410A-410D include a plurality of ports, with a subset of the ports grouped as a first group of ports 412 and a second group of ports 414.

Each of the internal ports 408 of a fifth leaf module 404A-404B is coupled to a port of the first group of ports 412 of a fifth spine module 410A-410B, within the switch 402A, through a midplane 409A. Each of the internal ports 408 of a fifth leaf module 404C-404D is coupled to a port of the first group of ports 412 of a fifth spine module 410C-410D, within the switch 402B, through a midplane 409B.

In one embodiment, the midplane 409A-409B may be configured similar to the midplane 212 described with respect to FIGS. 2A, 2B, 3A and 3B.

Now referring to FIG. 4A, in one embodiment, at least one of the external ports 406 of a fifth leaf module 404A-404B of a switch 402A is coupled to an external port 406 of a fifth leaf module 404C-404C of another switch 400B. For example, an external port 406 of fifth leaf module 404B of switch 402A is coupled to the external port 406 of fifth leaf module 404C of switch 402B.

In a configuration described with respect to FIG. 4A, for example, when a source system coupled to an external port 406 of a fifth leaf module 404A of switch 402A intends to communicate and send data to a destination system coupled to an external port 406 of a fifth leaf module 404D of switch 402B, there will be six hops, as further described below.

The first hop occurs when the external port 406 of the fifth leaf module 404A communicates the data to be transmitted to the internal port 408 that is coupled to one of the ports of the first group of ports 412 of fifth spine module 410B of the switch 402A.

Next, the second hop occurs when the data received at one of the ports of the first group of ports 412 of fifth spine module 410B is transmitted to the internal port 408 of the fifth leaf module 404B coupled to one of the other ports of the first group of ports 412 of the fifth spine module 410B.

The third hop occurs when the data is transmitted from the internal port 408 of the fifth spine module 404B to the external port 406 of the fifth spine module 404B that is coupled to the external port 406 of the fifth leaf module 404C of switch 402B.

Similarly, the fourth hop occurs in the fifth leaf module 404C, when it communicates the data to the fifth spine module 410D through its internal port 408 that is coupled to the fifth spine module 410D of switch 402B.

The fifth hop occurs when the data is transmitted from the fifth spine module 410D to the fifth leaf module 404D. Finally, the sixth hop occurs when the data is transmitted from the internal port of the fifth leaf module 404D to the external port 406 of the fifth leaf module 404D to which the destination system is coupled.

As one skilled in the art appreciates in a configuration described with respect to FIG. 4, maximum number of hops to communicate between a source system coupled to a port of a switch and a destination system coupled to a port of another switch will be six hops. Now, with respect to FIG. 4B, an alternate embodiment will be described, where the maximum number of hops will be reduced to four hops.

Now referring to FIG. 4B, the coupling configuration of fifth leaf modules 404A-404B, 404C-404D and the fifth spine modules 410A-410B, 410C-410D within a given switch 402A and 402B respectively, may be similar to the coupling configuration described with respect to FIG. 4A. The difference is in the way two switches 402A and 402B are coupled.

In the embodiment described with respect to FIG. 4B, some ports of the fifth spine modules 410A-410D are part of a second group of ports 414. At least one port of a second group of ports 414 of a fifth spine module 410A or 410B of the switch 402A is coupled to a port of a second group of ports 414 of a fifth spine module 410C or 410C of another switch 402B. For example, a port 414 of fifth spine module 410A of switch 402A is coupled to a port 414 of fifth spine module 410D. Similarly, a port 414 of fifth spine module 410B of switch 402A may be coupled to a port 414 of fifth spine module 410C of switch 402B.

In a configuration described with respect to FIG. 4B, for example, when a source system coupled to an external port 406 of a fifth leaf module 404A of switch 402A intends to communicate and send data to a destination system coupled to an external port 406 of a fifth leaf module 404D of switch 402B, there will be four hops, as further described below.

The first hop occurs when the external port 406 of the fifth leaf module 404A communicates the data to be transmitted from the source system to the internal port 408 that is coupled to one of the ports of the first group of ports 412 of either fifth spine module 410A or fifth spine module 410B of the switch 402A. Next, the second hop occurs when the data received at one of the ports of the first group of ports 412 of fifth spine module 410A or fifth spine module 410B is transmitted to a port of the second group of ports 414 of the fifth spine module 410A or 410B that is coupled to a fifth spine module of switch 402B. Let us assume, fifth spine module 410A of switch 402A is selected to transmit the data from the port coupled to the port of fifth spine module 410D of switch 402B.

The third hop occurs when the data is transmitted from a port of the second group of ports 414 of the fifth spine module 410Dd to a port of the first group of ports 412 that is coupled to the fifth leaf module 404D of switch 402B.

Finally, the fourth hop occurs when the data is transmitted from the internal port of the fifth leaf module 404D to the external port 406 of the fifth leaf module 404D to which the destination system is coupled.

As one skilled in the art appreciates in a configuration described with respect to FIG. 4B, maximum number of hops to communicate between a system coupled to a port of one switch and a system coupled to a port of another switch will be four hops, which is less than the maximum number of hops required under the configuration described with respect to FIG. 4A.

Although the foregoing example has been described with a port 414 of two spine modules (410A and 410B) of switch 402A coupled to a port 414 of two spine modules (410D and 410C) of switch 402B, the network of switch system 400 will operate with a port 414 of only one of the spine modules 410A or 410B of switch 402A coupled to a port 414 of only one of the spine modules 410C or 410D of switch 402B.

Figure 5:
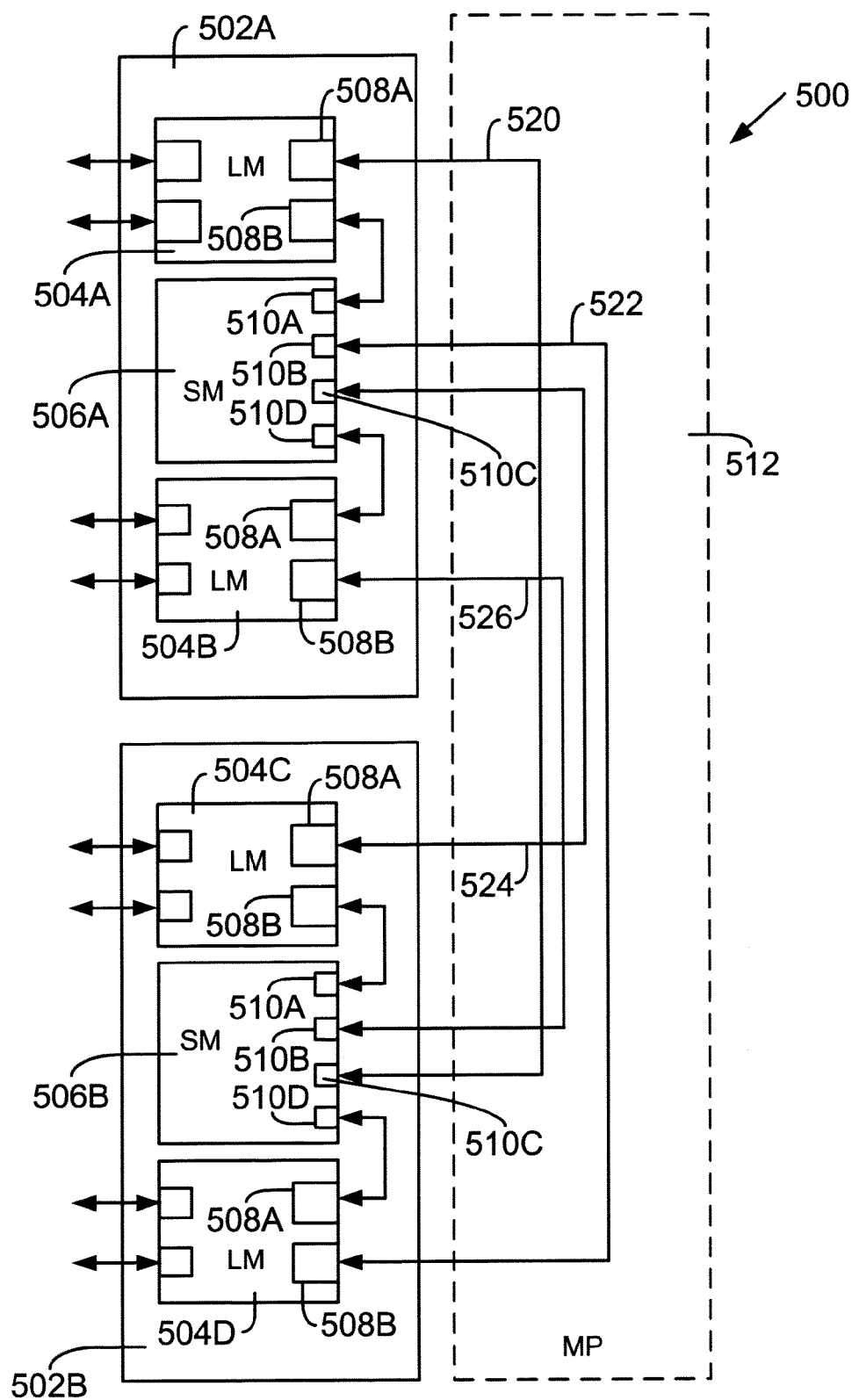
FIG. 5 shows a switch system with a plurality of leaf-spine modules, according to an embodiment of this disclosure.

FIG. 5 shows yet another switch system 500 that includes a plurality of leaf-spine modules 502A and 502B that are coupled to each other through a midplane 512, with less number of signal lines than a switch configuration that utilizes leaf modules and spine modules.

Referring to FIG. 5, the switch system 500 includes a plurality of leaf-spine modules 502A, 502B and a midplane 512. The leaf-spine module 502A includes at least two leaf modules 504A, 504B and a spine module 506A. The leaf-spine module 502B includes at least two leaf modules 504C, 504D and a spine module 506B Each of the leaf modules 504A-504D includes a plurality of ports, both internal ports 508 and external ports 504A-504B. Each of the spine modules 506A and 506B includes a plurality of ports 510A-510D.

Although the specific example described with respect to FIG. 5, each of the leaf modules has two internal ports and each of the spine modules has four ports, the adaptive aspects of this disclosure is not limited to the number of ports used in the example.

In one embodiment, the number of spine ports in a leaf-spine module is at least equal to the sum of number of leaf modules in all of the leaf-spine modules. For example, the number of spine ports 510A-510D in the leaf-spine modules 502A and 510B is four and is at least equal to the sum of number of leaf modules 504A-504D in all of the leaf-spine modules 502A and 502B. This configuration permits the coupling of one internal port of a leaf module of all the leaf-spine modules to one port of the spine module.

In such a configuration, the switch system 500 provides for a maximum of three hops to communicate data packets between a source system coupled to an external port of a leaf module of one leaf-spine module and a destination system coupled to an external port of a leaf module of another leaf-spine module, as will be further described later.

In this configuration, as an example, the internal port 508B of leaf module 504A is coupled to port 510A of the spine module 506A, the internal port 508A of leaf module 504B is coupled to port 510D of the spine module 506A.

Additionally, the internal port 508A of leaf module 504C of leaf-spine module 502B is coupled to port 510C of the spine module 506A through the midplane 512, using signal line 524. Further, the internal port 508B of leaf module 504D of leaf-spine module 502B is coupled to port 510B of the spine module 506A through the midplane 512, using signal line 522.

It is noteworthy that the coupling between an internal port of a leaf module and a port of the spine module within a leaf-spine module is performed without using the midplane 512. The signal lines of the midplane 512 is used to couple an internal port of a leaf module of one leaf-spine module with a port of a spine module of another leaf-spine module.

As an example, the coupling between four leaf modules 504A-504D and two spine modules 506A-506B of switch system 500 is accomplished using a midplane 512 with four signal lines 520, 522, 524 and 526. In other words, in this configuration, the minimum number of ports required for a spine module and the number of signal lines required to couple the leaf modules with spine modules is equal to the total number of leaf modules.

On the other hand, if the leaf modules and the spine modules were all coupled using the midplane, such that at least one internal port of each leaf module are coupled to a port of a spine module, the number of signal lines required to couple four leaf modules with two internal ports and two spine modules with four ports each would have been eight signal lines.

This configuration also provides a maximum of three hops. As one skilled in the art appreciates, the configuration described with reference to FIG. 5 provides for a reduced number of signal lines in the midplane, yet providing the same number of maximum hops as for example, described previously with respect to FIGS. 2A and 2B.

Figure 6A:
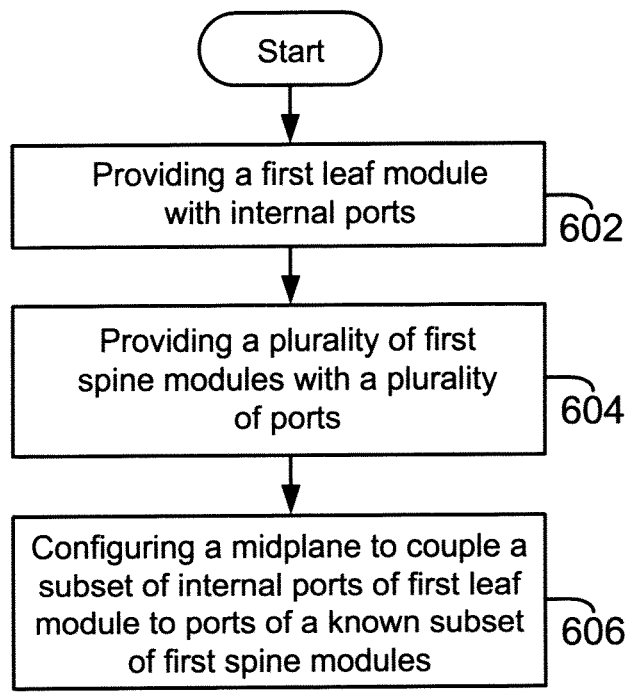
FIGS. 6A and 6B show a process flow diagram to configure a switch system, according to an embodiment of this disclosure.

Now referring to FIGS. 6A and 6B, a method to configure a switch system to network a plurality of systems will be described.

The method includes in step 602, providing a first leaf module having a plurality of ports divided into internal ports and external ports; in step 604, providing a plurality of first spine modules, each first spine module having a plurality of ports; and in step 606, configuring a midplane to couple each of the internal port of first leaf module to a port of a first spine module such that a subset of internal ports of the first leaf module are always coupled to a known subset of first spine modules.

In step 602, a first leaf module having a plurality of ports divided into internal ports and external ports is provided. For example, referring to FIG. 2A, a first leaf module 202A, 202B, 202C each with internal ports 204A-204C and external ports 206 is provided.

In step 604, a plurality of first spine modules is provided, with each first spine module having a plurality of ports. For example, referring to FIG. 2A, a plurality of first spine modules 208A-208C are provided with each first spine module 208 having a plurality of ports 210.

In step 606, a midplane is configured to couple each of the internal port of first leaf module to a port of a first spine module such that a subset of internal ports of the first leaf module are always coupled to a known subset of first spine modules. Referring to FIG. 2A, the midplane 212 is configured such that each of the internal ports 204A-204C of a first leaf module 202A-202C are coupled to a port 210 of a first spine module 208A-208C such that a subset of internal ports, for example, internal port 204A of the first leaf module 202A-202C are always coupled to a known subset of first spine module, for example, first spine module 208A.

Figure 6B:
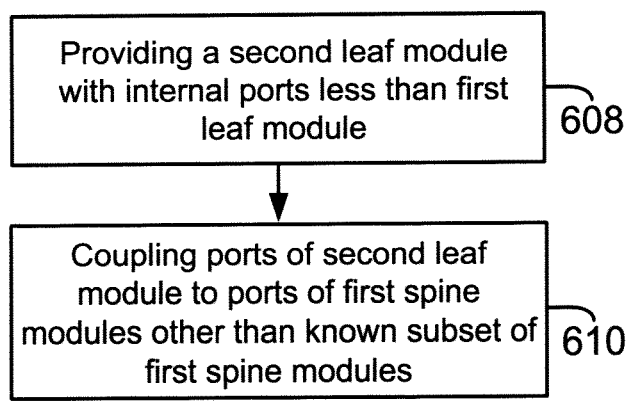

Now referring to FIG. 6B, the method further includes the step 608 of providing a second leaf module with internal ports less than the first leaf module and step 610 of coupling ports of the second leaf module to ports of first spine module other than known subset of first spine module.

For example, referring to step 608, a second leaf module with internal ports less than the first leaf module is provided. Now referring to FIG. 2B, a second leaf module 222A-222C having a plurality of ports divided into internal ports 224B-224C and external ports 226 is provided. The number of internal ports 224B-224C of the second leaf module 222B-222c is less than the number of internal ports 204a-204c of first leaf module 202a-202C.

For example, in step 610, the second leaf module is coupled to the plurality of first spine modules using the midplane such that each of the internal ports of the second leaf module is coupled to a port of a spine module other than the known subset of first spine module. Now referring to FIG. 2B, the second leaf module 222A-222C are coupled to the plurality of first spine modules 208B-208C using the midplane 212 such that each of the internal ports 224B-224C of the second leaf module 222A-222C) is coupled to a port 210 of a spine module other than the known subset of first spine module (208B, 208C).

Figure 7:
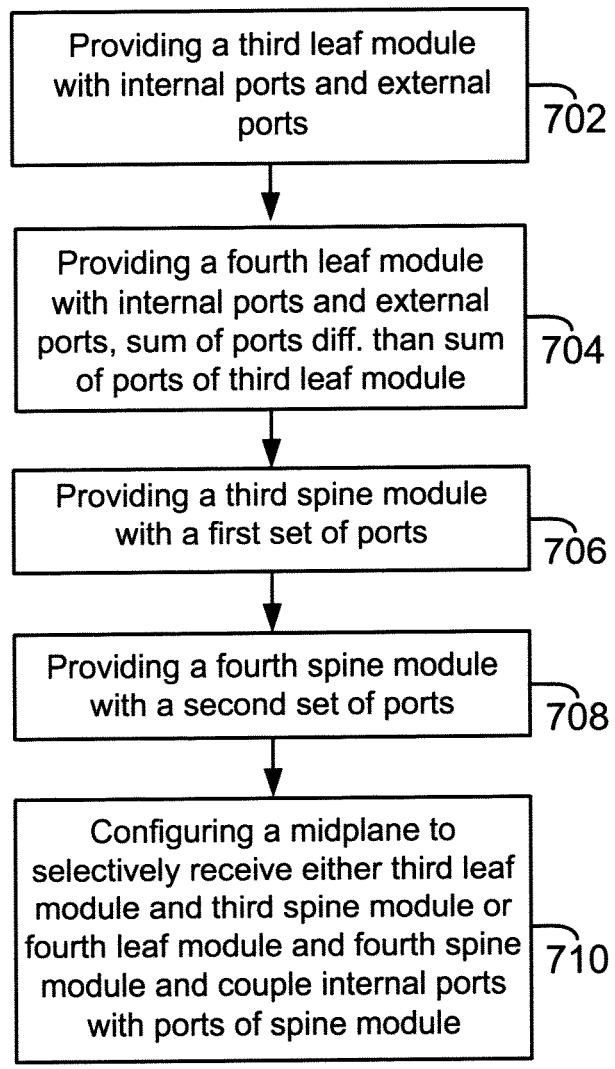
FIG. 7 shows a process flow diagram to selectively configure a network switch system, according to an alternate embodiment of this disclosure.

Now referring to FIG. 7, a method to selectively configure a network switch system will be described. The method includes in step 702, providing a third leaf module with internal ports and external ports; in step 704, providing a fourth leaf module with internal ports and external ports, sum of ports different than the sum of ports of third leaf module; in step 706, providing a third spine module with a first set of ports; in step 708, providing a fourth spine module with a second set of ports; and in step 710, configuring a midplane to selectively receive either the third leaf module and third spine module or fourth leaf module and fourth spine module and couple internal ports with ports of spine module.

For example, referring to step 702, a third leaf module with internal ports and external ports is provided. Now referring to FIG. 3A, a third leaf module 302A-302C, each having a third set of ports divided into plurality of internal ports 304A-304C and a plurality of external ports 306 is provided.

Referring to step 704, a fourth leaf module with internal ports and external ports is provided, wherein the sum of ports is different than the sum of ports of third leaf module. Now referring to FIG. 3B, a fourth leaf module 322B-322C, each having a fourth set of ports divided into plurality of internal ports 324B-324C and external ports 326 is provided. The number of external ports 326 is equal to the number of internal ports 324B-324C. The number of third set of ports in third leaf modules 302A-302C is different than the number of fourth set of ports in fourth leaf modules 322B-322C.

Referring to step 706, a third spine module with a first set of ports is provided. For example, referring to FIG. 3A, third spine module 308A-308C is provided with a first set of ports 310.

Referring to step 708, a fourth spine module with a second set of ports is provided. For example, referring to FIG. 3B, a fourth spine module 328B-328C is provided with a second set of ports 329.

Referring to step 710, a midplane is configured to selectively receive either the third leaf module and third spine module or fourth leaf module and fourth spine module. The midplane couples internal ports of the third leaf module with ports of third spine module or internal ports of fourth leaf module with ports of fourth spine module respectively.

Now, referring to FIGS. 3A and 3B, the midplane 212 is configured to selectively receive either the third leaf module 302A-302C and third spine modules 308A-308C or fourth leaf modules 322B-322C and fourth spine modules 328B-328C. The midplane 212 couples internal ports 304A-304C of the third leaf module 302A-302C with ports 310 of third spine modules 308A-308C or internal ports 324B-324C of fourth leaf modules 322B-322C with ports 329 of fourth spine modules 328B-328C respectively.

Figure 8:
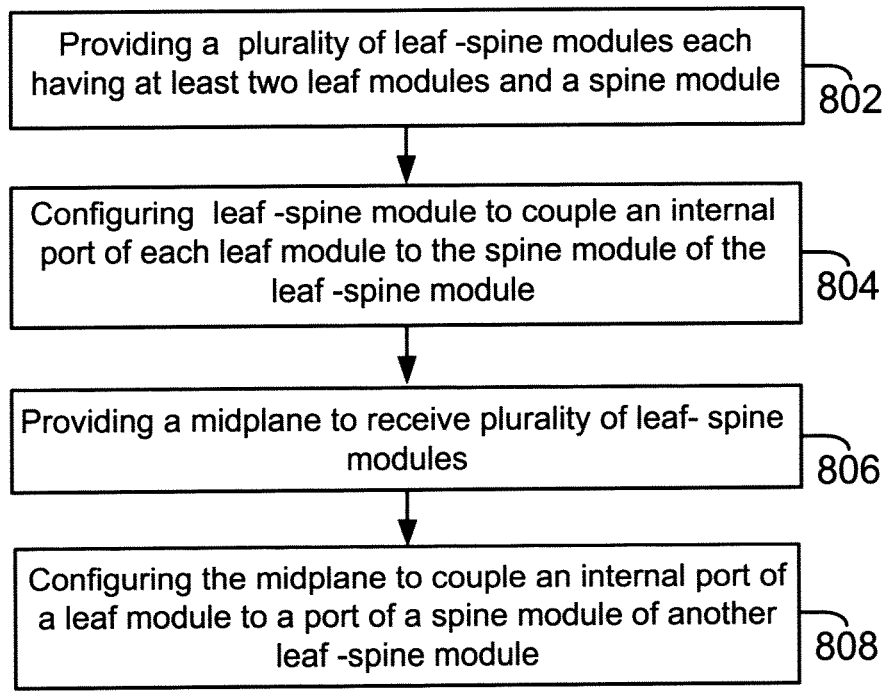
FIG. 8 shows a process flow diagram to configure a switch system, according to an alternate embodiment of this disclosure.

Now referring to FIG. 8, a method of configuring a switch system is disclosed. The method includes in step 802, providing a plurality of leaf-spine modules, each having at least two leaf modules and a spine module; in step 804, configuring leaf-spine module to couple an internal port of each leaf module to the spine module of the leaf-spine module; in step 806, providing a midplane to receive the plurality of leaf-spine modules; and in step 808, configuring the midplane to couple an internal port of a leaf module to a port of a spine module of another leaf-spine module.

Now referring to step 802, a plurality of leaf-spine modules are provided. Each of the leaf-spine modules has at least two leaf modules and a spine module. Referring to FIG. 5, a plurality of leaf-spine modules 502A and 502B are provided. The leaf-spine module 502A has at least two leaf modules 504A and 504B, and a spine module 506A. The leaf-spine module 502B has at least two leaf modules 504C and 504D, and a spine module 506B.

Now referring to step 804, the leaf-spine modules are configured to couple an internal port of each leaf module to the spine module of the leaf-spine module. Referring to FIG. 5, the internal port 508A of the leaf module 504A of the leaf-spine module 502A is coupled to the port 510A of the spine module 506A of the same leaf-spine module 502A.

Now referring to step 806, a midplane is provided to receive the plurality of leaf-spine modules. Referring to FIG. 5, a midplane 512 is provided to receive the plurality of leaf-spine modules 502A and 502B.

Referring to step 808, the midplane is configured to couple an internal port of a leaf module to a port of a spine module of another leaf-spine module. Referring to FIG. 5, the midplane 512 is configured to couple an internal port 508A of the leaf module 504A of leaf-spine module 502A to a port 510C of spine module 506B of the leaf-spine module 502B, using the signal line 520.

Figure 9:
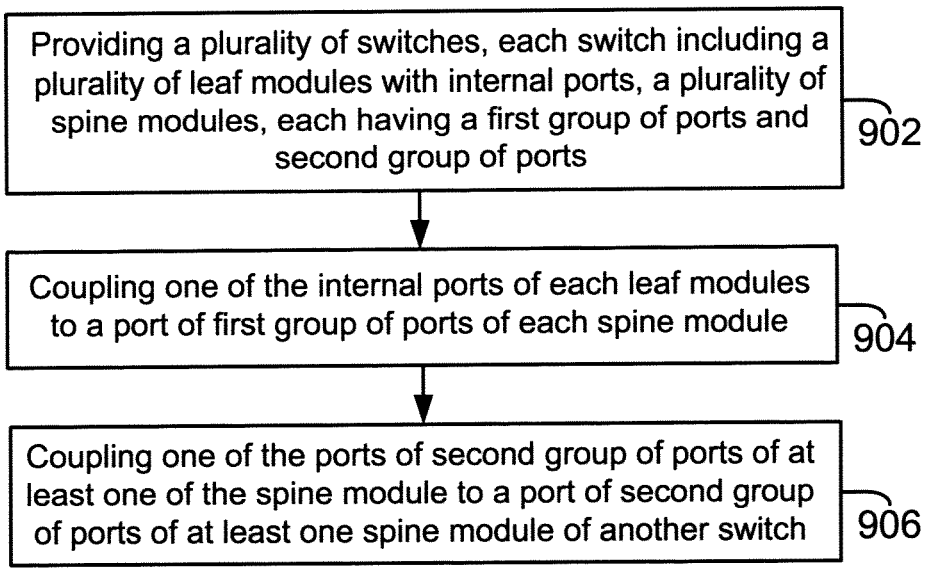
FIG. 9 shows a process flow diagram to network a plurality of switches, according to an embodiment of this disclosure.

Now referring to FIG. 9, a method of networking a plurality of switches will be described. The method includes in step 902, providing a plurality of switches, each switch including a plurality of leaf modules with internal ports, a plurality of spine modules, each having a first group of ports and a second group of ports; in step 904, coupling one of the internal ports of each leaf module to a port of first group of ports of each spine module; and in step 906, coupling one of the ports of second group of ports of at least one of the spine module to a port of a second group of ports of at least one spine module of another switch.

Referring to step 902, a plurality of switches are provided. Each switch includes a plurality of leaf modules with internal ports, a plurality of spine modules, each spine module having a first group of ports and a second group of ports.

Referring to FIG. 4B, a plurality of switches 402A and 402B are provided. Switch 402A includes a plurality of leaf modules 404A-404B, with internal ports 408, a plurality of spine modules 410A-410B. Each spine module 410A, 410B have a plurality of ports, the plurality of ports divided into a first group of ports 412 and a second group of ports 414. Switch 402B includes a plurality of leaf modules 404C-404D, with internal ports 408, a plurality of spine modules 410C-410D. Each spine module 410A, 410B have a plurality of ports, the plurality of ports divided into a first group of ports 412 and a second group of ports 414.

Referring to step 904, one of the internal ports of each leaf module is coupled to a port of first group of ports of each spine module. Referring to FIG. 4B, in switch 402A, one of the internal ports 408 of each leaf module 404A and 404B is coupled to a port of first group of ports 412 of each spine module 410A and 410B. In switch 402B, one of the internal ports 408 of each leaf module 404C and 404D is coupled to a port of first group of ports 412 of each spine module 410C and 410D.

Referring to step 906, one of the ports of second group of ports of at least one of the spine module is coupled to a port of a second group of ports of at least one spine module of another switch. Referring to FIG. 4B, one of the ports of second group of ports 414 of at least one of the spine module 410A, 410B of switch 402A is coupled to a port of a second group of ports 414 of at least one spine module 410C, 410D of another switch 402B.

Although the present invention has been described with reference to specific embodiments, these embodiments are illustrative only and not limiting. Many other applications and embodiments of the present disclosure will be apparent in light of this disclosure.

What is claimed is:

1. A network device for facilitating communication in a network, the network device comprising:
   a plurality of leaf-spine modules; and
   a midplane coupling the leaf-spine modules to each other;
   wherein each leaf-spine module comprises at least one leaf module having a plurality of ports divided into internal ports and external ports; and
   at least one spine module having at least one spine port;
   wherein the number of spine ports in each of the leaf-spine modules is at least equal to the number of leaf modules in the network device and equal to half the number of ports of the leaf modules, and the at least one spine module is operated at a speed equal to about twice a speed of the leaf modules to provide full bisectional bandwidth.

2. The network device of claim 1, wherein the network device is a switch.

3. A network device for facilitating communication in a network, the network device comprising:
   a plurality of leaf-spine modules; and
   a midplane coupling the leaf-spine modules to each other;
   wherein each leaf-spine module comprises:
      at least one leaf module having a plurality of ports divided into internal ports and external ports; and
      at least one spine module having at least one spine port;
   wherein one of the internal ports of one of the leaf modules is coupled to one of the spine ports without using the midplane, and the number of spine ports is equal to half the number of ports of the leaf modules, and the at least one spine module is operated at a speed equal to about twice a speed of the leaf modules to provide full bisectional bandwidth.

4. The network device of claim 3, wherein the network device is a switch.

5. A method of configuring a network device having a plurality of leaf-spine modules and a midplane coupling the leaf-spine modules to each other, each leaf-spine module including at least two leaf modules and a spine module, each of the leaf modules having a plurality of ports divided into internal ports and external ports, each of the spine module having at least one spine port, the method comprising:

in a first one of the leaf-spine modules, coupling one of the internal ports of a first one of the leaf modules to one of the spine ports of the first leaf-spine module without using the midplane; and using the midplane, coupling another one of the internal ports of the first leaf module to one of the spine ports of the spine module of a second one of the leaf-spine modules, wherein the number of spine ports is equal to half the number of ports of the leaf modules, and further comprising operating the at least one spine module at a speed equal to about twice a speed of the leaf modules to provide full bisectional bandwidth.

6. The method of claim 5, wherein the network device is a switch.

* * * * *